United States Patent [19]
Nelson

[11] Patent Number: 5,544,931
[45] Date of Patent: *Aug. 13, 1996

[54] AERODYNAMIC STABILIZER FOR USE WITH A MOTOR VEHICLE

[75] Inventor: Gary Nelson, Concord, N.C.

[73] Assignee: National Association For Stock Car Auto Racing, Inc., Daytona Beach, Fla.

[*] Notice: The term of this patent shall not extend beyond the expiration date of Pat. No. 5,374,098.

[21] Appl. No.: 331,897

[22] Filed: Oct. 31, 1994

Related U.S. Application Data

[63] Continuation-in-part of Ser. No. 182,411, Jan. 14, 1994, Pat. No. 5,374,098.

[51] Int. Cl.⁶ .................................................. B62D 35/00
[52] U.S. Cl. ...................................... 296/180.1; 296/180.5
[58] Field of Search ........................... 296/180.1, 180.5; 180/903; 188/270

[56] References Cited

U.S. PATENT DOCUMENTS

| | | | |
|---|---|---|---|
| 1,389,757 | 9/1921 | Haynes | 188/270 X |
| 2,149,161 | 2/1939 | Byrnes | 180/270 |
| 2,979,165 | 4/1961 | McCambridge | 188/270 |
| 3,225,376 | 12/1965 | Heiler | 15/250.19 |
| 3,596,974 | 8/1971 | Adams | 296/91 X |
| 4,170,377 | 10/1979 | Ingram | 296/191 X |
| 4,256,339 | 3/1981 | Ingram | 296/180.5 |
| 4,674,788 | 6/1987 | Ohmura et al. | 296/91 X |
| 4,925,236 | 5/1990 | Itoh et al. | 296/180.5 |
| 5,054,844 | 10/1991 | Miwa | 296/198 |
| 5,374,098 | 12/1994 | Nelson | 296/180.5 X |

FOREIGN PATENT DOCUMENTS

| | | | |
|---|---|---|---|
| 3115150 | 11/1982 | Germany | 296/180.1 |
| 82681 | 4/1991 | Japan | 296/180.5 |
| 4008681 | 1/1992 | Japan | 296/180.1 |
| 6008859 | 1/1994 | Japan | 296/180.5 |
| 6156326 | 6/1994 | Japan | 296/180.5 |

*Primary Examiner*—Dennis H. Pedder
*Attorney, Agent, or Firm*—Bell, Seltzer, Park & Gibson, P.A.

[57] ABSTRACT

There is provided an aerodynamic stabilizer assembly adapted to be mounted in the rear portion of the roof of a motor vehicle. The assembly includes a framework having a front edge and partitioned to define separate openings. A pair of elongated air deflection panels each sized to cover one of the framework openings and each air deflection panel being pivotedly mounted to the framework along a longitudinal axis at the front edge of the assembly framework and being pivotable between a lowered passive position and a raised active position. The assembly framework also includes a restraint for limiting the upward rotational movement of the rear edge of each of the panels beyond the raised active position. There is also provided a deflection plate mounted along the left side of the assembly framework and a rear air deflector located on and adjacent to the rear window and extending from the roof to the rear deck. When a motor vehicle is moving at a high rate of speed and is spinning out the low pressure of the air moving across the roof creates a pressure differential which acts on the panels and causes the panels to rotate to the active raised position thereby resulting in a downward force urging the motor vehicle against the road.

10 Claims, 3 Drawing Sheets

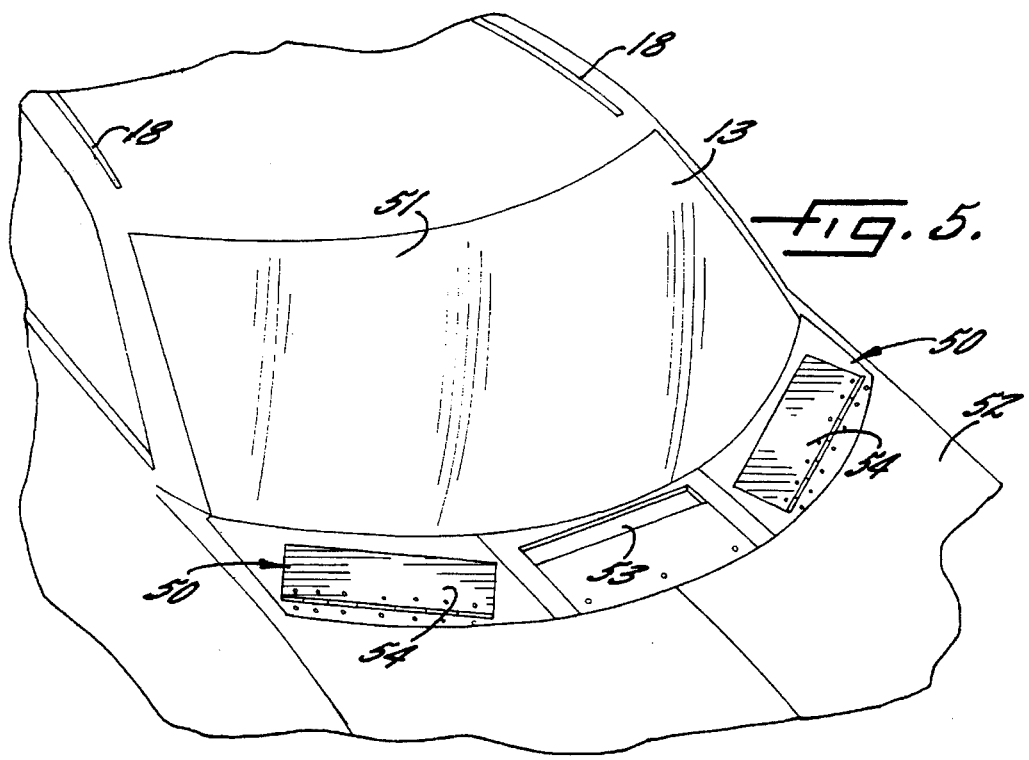
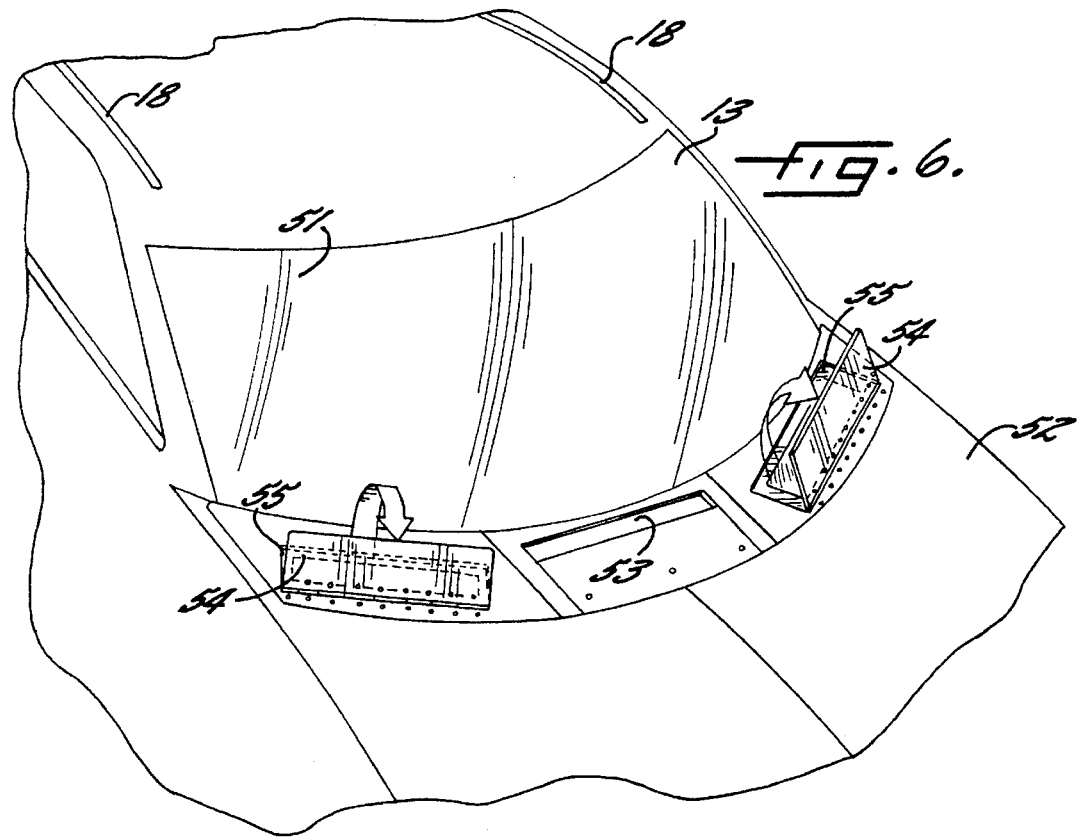

5,544,931

AERODYNAMIC STABILIZER FOR USE WITH A MOTOR VEHICLE

CROSS REFERENCE TO RELATED APPLICATIONS

This application is a continuation-in-part of application Ser. No. 182,411 filed Jan. 14, 1994 and now allowed as U.S. Pat. No. 5,374,098.

BACKGROUND OF THE INVENTION

1. Field of the Invention

The present invention relates to an aerodynamic stabilizer safety device for use with motor vehicles, especially race cars. More particularly, this invention relates to an apparatus for assisting motor vehicles to remain on the road surface during a spin-out at high speeds.

2. The Prior Art

When race cars are properly aligned on a race track their tires tend to remain on the track surface even at high speeds when the cars use wind deflection devices such as rear deck spoilers and the like. However, occasionally race cars spin-out at high speeds, i.e., they rotate, usually in a counter clockwise direction. At the high speeds, say 140 miles per hour and higher, the aerodynamic forces at certain angles during the spin-out cause the vehicle to lift off of the track leaving the driver with no way of controlling the car.

As the car spins, the air passing over the hood, roof and rear deck lowers the air pressure—just like the lift on an airplane wing—sufficiently to cause the car to lift off the track. As the car rotates past 90° during spin-out, the rear of the vehicle becomes the leading edge. The sudden lowering in air pressure on the vehicle's horizontal surface during spin-out—when the yaw angle ranges from 70° to about 150° when the vehicle is going over 140 miles per hour—causes the vehicle to lift off the surface of the track.

It is thus desirable to incorporate devices into the cars which while maintaining maximum speed will increase safety during spin-out by killing lift (pressure), increasing aerodynamic drag (Speed) and regain or maintain tire traction. For example, in co-pending application U.S. patent application Ser. No. 182,411, filed Jan. 14, 1994, for Aerodynamic Stabilizer For Use With A Motor Vehicle, there is disclosed an aerodynamic stabilizer assembly mounted in the rear of the roof of a vehicle in which a pair of pivotedly mounted air deflection panels are caused to pivot between a lowered passive position and a raised active turbulence producing position. The air deflection panels create significant air turbulence across the roof area resulting in killing a major portion of the lift and increasing aerodynamic drag. However, there remains some areas where the air stream passing over the hood, roof and rear deck of the car at certain angles during spin-out that are not effected by the air deflection panels.

It is therefore an object of the present invention to provide improved aerodynamic stabilizing for increasing the safety of motor vehicles, especially race cars, during spin-out.

Another object of the present invention is to provide an improved device for deflecting the movement of air across the roof of a moving vehicle.

Yet another object of the present invention is to provide an air deflector positioned to create air turbulence as the air passes across the rear window of a car during a spin-out.

A still further object of the present invention is to provide a device for creating air turbulence as air passes across the hood of a car during a spin-out.

SUMMARY OF THE INVENTION

In accordance with the present invention, these and other objects, features and advantages are achieved by the embodiments illustrated herein by the provision of an improved aerodynamic stabilizer adapted to be mounted to the roof panel of a motor vehicle. When a motor vehicle is moving at a high rate of speed and is spinning out the air pressure differential flowing across the roof causes a pair of elongated air deflection panels on the aerodynamic stabilizer to automatically rotate to a raised position to act as an air dam creating air turbulence and urging the vehicle against the road. The aerodynamic stabilizer assembly is preferably affixed to an opening located in the rear portion of the roof of a motor vehicle. Each opening may be disposed at an angle to one another. It was surprisingly found that the area of lowest air pressure across the top of a moving vehicle during spin-out at a high rate of speed is at the rear of the roof panel.

The aerodynamic stabilizer assembly includes a framework having a front edge and partitioned to define two separate openings. A pair of elongated air deflection panels each sized to cover a respective framework openings and each air deflection panel being pivotedly mounted to the framework along a longitudinal axis at the front edge of the assembly framework and being pivotable between a lowered passive position and a raised active position. The elongated air deflection panels preferably fit in such a relationship with the roof panel opening that no increased drag occurs across the roof when the deflection panels are in a lowered passive position. There are springs arranged on each longitudinal axis for biasing each air deflection panel toward the lowered passive position. The assembly frame also includes means for limiting the upward rotational movement of the rear edge of each of the elongated air deflection panels beyond the raised active position. In one embodiment, one of the elongated air deflection panels is disposed in said roof opening substantially perpendicular to a center line from the front to the rear of the roof.

In another embodiment, an air deflection plate is pivotedly mounted in the assembly framework to the left side (driver's side) of the left framework opening. The air deflection plate is caused to rise when the air deflection panels pivot to a raised active position. In addition, further air turbulence during spin-out is created by an air deflector located to the left of the rear window.

In yet another embodiment, cowls having pivotedly mounted panels covering the cowl openings are provided at the rear of the hood and in front of the windshield. The cowls are open to the underside of the vehicle. The panels open in a manner similar to the roof panels and thereby serve to rapidly equalize the air pressure above the hood with the air pressure beneath the vehicle.

BRIEF DESCRIPTION OF THE DRAWINGS

Other objects, features and advantages of the invention will be apparent from the detailed description of the invention when taken in conjunction with the accompanying drawings, in which:

FIG. 5 is a perspective view showing a portion of the front of a motor vehicle illustrating the air deflection cowl covers used with the aerodynamic stabilizer of the present invention; and FIG. 6 is a perspective view of the cowl covers of the present invention in the active upraised position.

DESCRIPTION OF THE PREFERRED EMBODIMENTS

Figure 1:
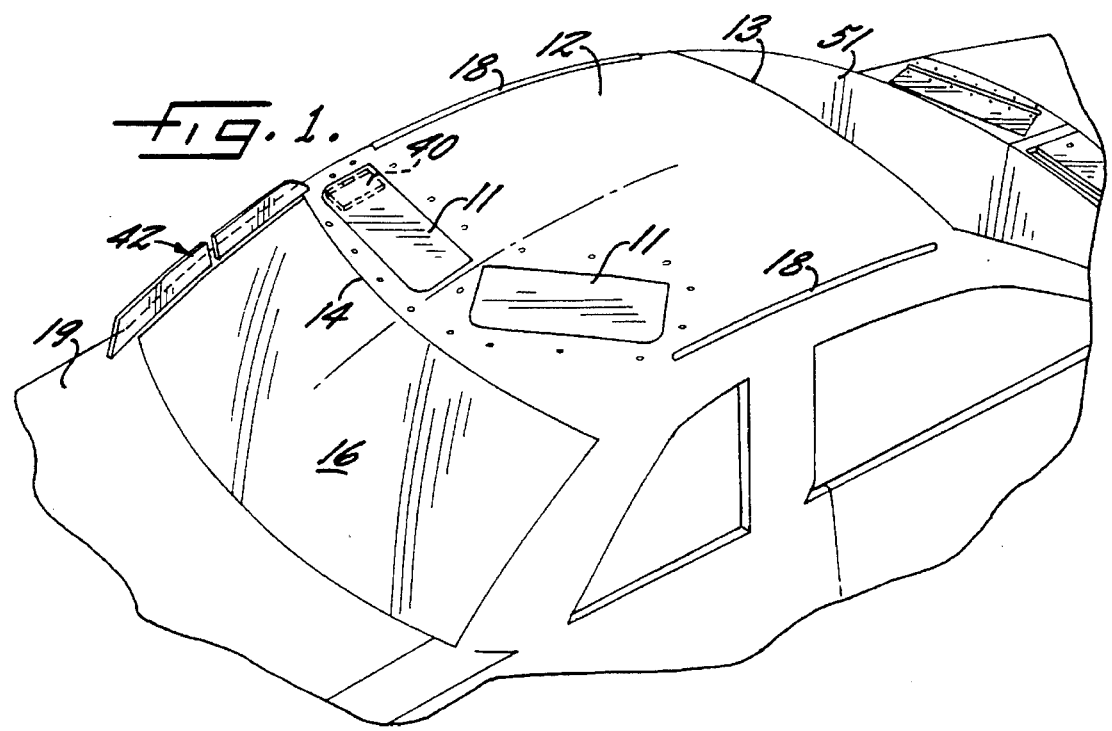
FIG. 1 is a perspective view of a motor vehicle roof viewed from the rear of the vehicle illustrating the air deflection panels of the aerodynamic stabilizer assembly of the present invention in passive position.

In accordance with the present invention, there is provided in the roof of a vehicle an aerodynamic stabilizer 10. Referring now more specifically to the drawings, FIG. 1 shows a motor vehicle having a roof 12, a front end 13, a rear end 14 and air deflecting side rails 18. The perspective view shows the air deflection panels 11 of the aerodynamic stabilizer assembly placed in-openings 15a, 15b at the rear of the roof 12 in a retracted or passive position. The panels 11 of the aerodynamic stabilizer assembly 10 are rotatably movable between a passive position shown in FIG. 1 and an active position shown in FIG. 2.

Figure 2:
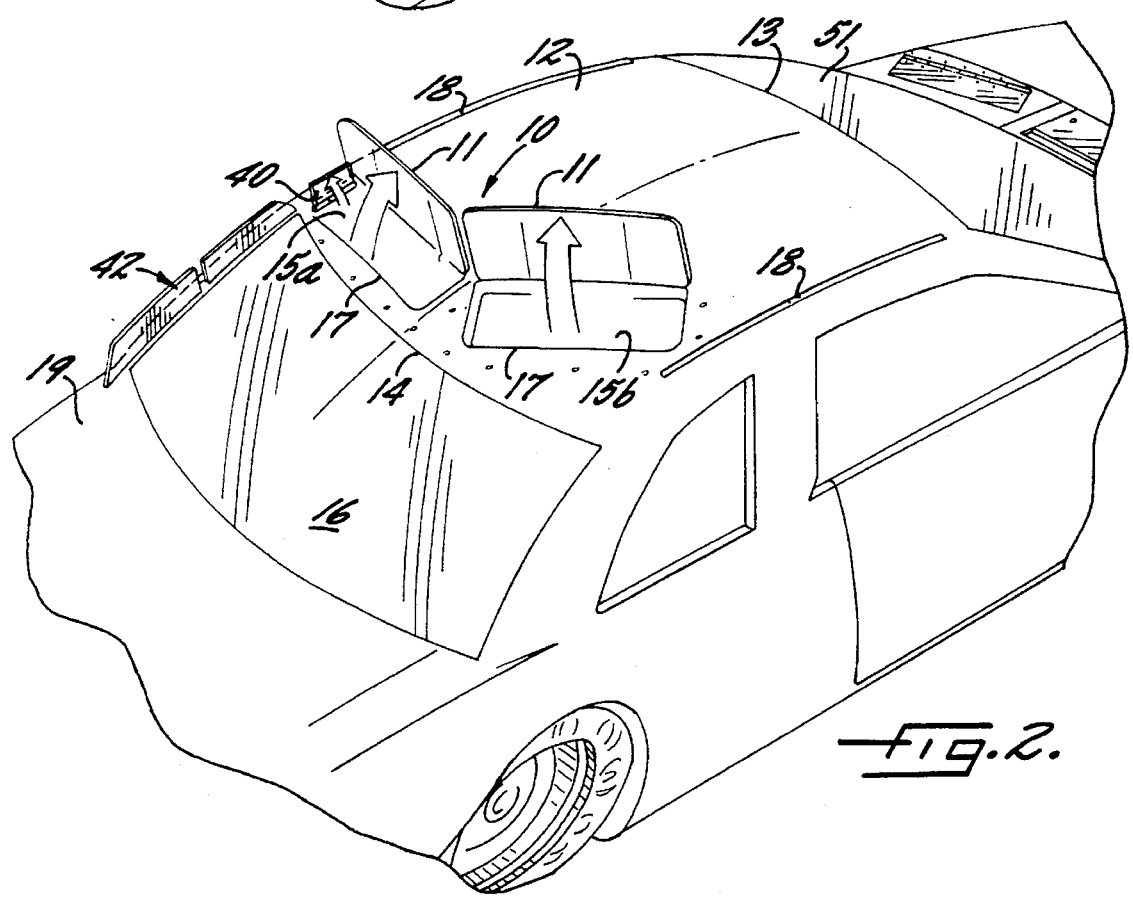
FIG. 2 is a perspective view of a motor vehicle roof viewed from the rear of the vehicle illustrating the air deflection panels of the aerodynamic stabilizer of the present invention in active position.

As shown more clearly in FIG. 2, the aerodynamic stabilizer assembly 10 is located in open framework in the rear portion of the roof of an automobile partitioned into two portions with each portion disposed at an angle to one another. It was surprisingly found that the area of lowest air pressure across the top of a moving vehicle is at the rear of the roof panel. A pair of roof openings 15a, 15b, each have a front edge and are located in the rear portion of the vehicle roof 12. Each opening is preferably disposed at an angle to one another.

Figure 3:
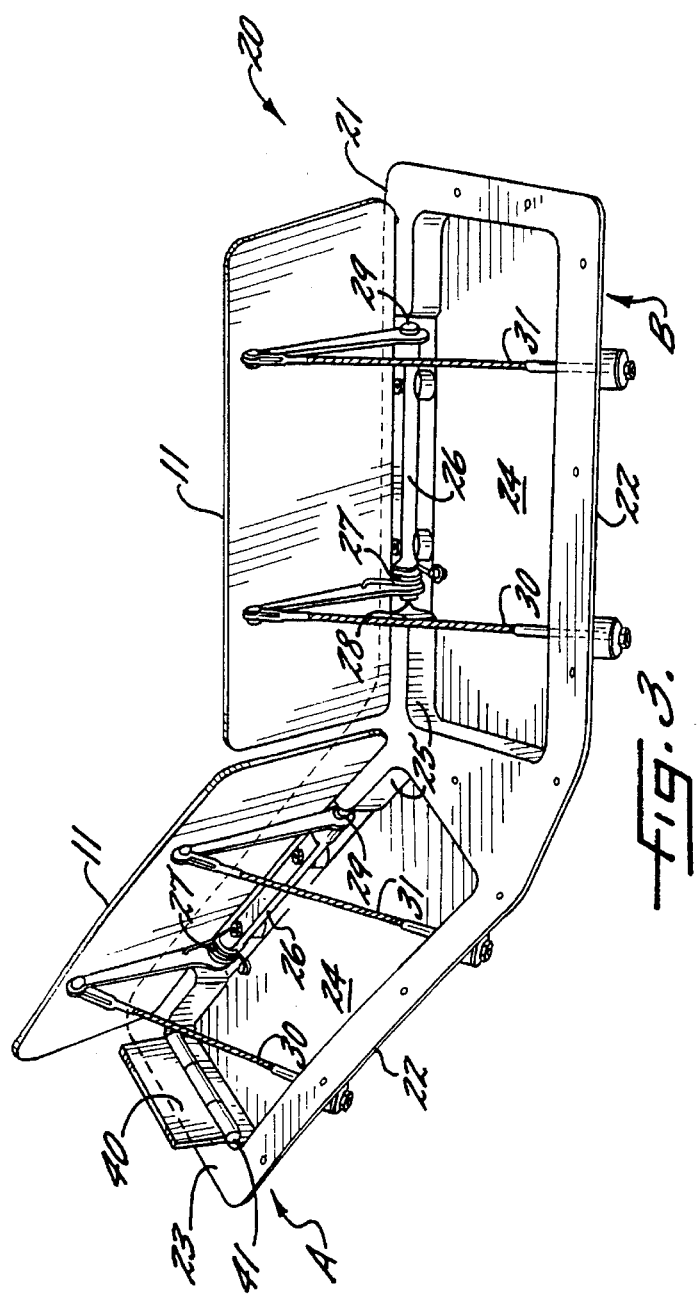
FIG. 3 is a perspective view of the aerodynamic stabilizer framework assembly of the present invention.

Turning now to FIG. 3, there is shown an assembly frame 20 having a front edge 21 and a rear edge 22. The assembly frame is partitioned into a left portion A and a right portion B, with each portion disposed at an angle to one another. The portions A and B of the assembly frame are disposed at an angle of from 5 to 60 degrees from each other. The assembly frame 20 has a flange 23 extending around the periphery which may be used to affix the assembly frame to the roof beneath each of said roof openings. The assembly frame 20 may be affixed using rivets or the like. Each of portions A and B may form a well having a closed bottom 24 and sides 25. The depth of each well may vary but in general is from about 1 inch to 2 inches deep, sufficient to accommodate the workings of the assembly.

A pair of elongated air deflection panels 11 is provided. Each panel may be generally rectangular but is sized to cover one of the framework openings. Each air deflection panel is pivotally mounted 28, 29 to the framework along a longitudinal axis 26 at the front edge of the assembly framework 20. In a preferred embodiment the elongated air deflection panels fit flush with the upper surface of the roof. In another embodiment one of the elongated air deflection panels is disposed in said roof perpendicular to a center line from the front to the rear of the roof. The elongated air deflection panels are disposed at an angle of from 5 to 60 degrees from each other.

The elongated air deflection panels are biased on each longitudinal axis toward the passive position. The biasing means are preferably springs 27. Means are provided for limiting the upward movement of each of said air deflection panels. A preferred means for limiting the upward movement of each of said elongated air deflection panels are cables 30, 31 to limit the upward rotational movement of the rear edge of the panel beyond the raised active position. The cables have one end attached toward a rear edge of the elongated air deflection panel and the other end attached to the rear portion of the assembly framework.

The more turbulence that is created as air crosses the vehicle's roof and rear deck during a spin-out, the quicker the lift will be killed and the aerodynamic drag increased. Thus, it has also been found that additional air turbulence is created when an air deflection plate 40 is pivotedly mounted to the left side of portion A of assembly frame 20. While not constrained by size, it has been found that an elongated, rigid plate 40 about 2 inches wide positioned to the left side of the left panel A in a direction longitudinal with the left side edge of the opening in portion A is effective to cause air turbulence when in an active position as shown in FIG. 2. The rigid plate 40 may be attached to the well area with, for example, a piano hinge. The rigid plate automatically raises to the active position when the panels 11 lift. When the air pressure equalizes the rigid plate 40 returns to its passive position within the well.

In another embodiment of the present invention there is provided a stationary rear air deflector 42. As shown in FIGS. 1 and 2, the rear air deflector 42 creates air turbulence as the air passes from right to left across the rear window during a spin-out. The elongated air deflector 42 is a rigid strip of material, such as a plastic, affixed to the vehicle on or adjacent to the left side of the rear window 16. The stationary air deflector preferably extends longitudinally from the rear 14 of roof 12 following the assembly frame 20 to the rear deck 19. The height of the stationary air deflector 42 may vary but in general is from about ½ inch in height to about 2 inches in height. The air deflector may also be, as shown in FIG. 2, affixed in more than one section.

Figure 4:
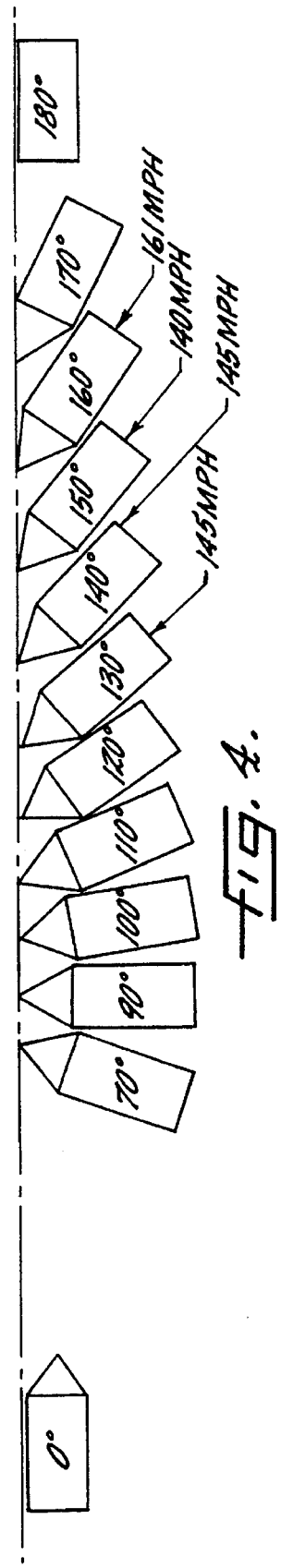
FIG. 4 is a diagram showing the yaw angle and the speed at which a moving automobile lifts off of the track.

Turning now to FIG. 4 there is shown the relationship between the yaw angle and the speed of the race car at which the car leaves the race track. It is this angle and speed at which air pressure differential is sufficiently low to cause the air deflection panels to rotate from the lowered passive position to the raised active position. Once the air pressure equalizes the air deflection panels automatically return to the lowered passive position due to the biasing means.

There is shown in FIGS. 5 and 6, a further embodiment of the present invention wherein there is provided cowls 50 having pivotedly mounted panels covering the cowl openings 55. The cowls 50 are located to the rear of the hood 52 and in front of the windshield 51. The panels 54 open and operate in a manner similar to the panels 11 of aerodynamic stabilizer 10 and thereby serve to rapidly equalize the air pressure above the hood with the air pressure beneath the vehicle.

As shown in FIG. 5, the cowls 50 are located to the sides of air inlet 53. The cowl opening 55 extends downwardly through the vehicle. Each panel is generally rectangular and sized to cover the cowl opening and is biased on its longitudinal axis toward the closed or passive position shown in FIG. 5. Each of panels 54 in passive position fits flush with the surrounding surface to prevent drag as air passes over the panel.

In operation, the aerodynamic stabilizer begins to function when the motor vehicle is moving at a high rate of speed and during spin-out. The panels activate when the low pressure of the air moving across the vehicle creates a pressure differential which acts on the panels and causes the panels to rotate from the lowered passive position to the active raised position thereby resulting in a downward force acting on the panels and thus, on the motor vehicle roof and hood by reason of the air moving across the roof and hood and urging the motor vehicle against the road.

The invention has been described in detail with particular reference to preferred embodiments and the operation thereof, but it is understood that variations, modifications, and the substitution of equivalent means can be effected within the spirit of this invention.

What is claimed is:

1. An aerodynamic stabilizer assembly adapted to be mounted in the roof of a motor vehicle having a rear deck and a rear window located between said roof and said rear deck comprising:

an assembly framework having a front edge, a rear edge, side edges and partitioned so as to define a left opening and a right opening;

a pair of elongated air deflection panels, each having a front edge and a rear edge, and each panel being sized to cover one of said framework openings and each air deflection panel being pivotedly mounted along a longitudinal axis at the front edge of said assembly framework so as to be pivotable between a lowered passive position covering the respective framework opening and a raised active position;

means arranged on each longitudinal axis for biasing each air deflection panel toward said passive position;

means for limiting the upward rotational movement of the rear edge of each of each elongated air deflection panels beyond said raised active position, whereby when said motor vehicle is moving at a high rate of speed and is spinning out the low pressure of the air moving across the roof creates a pressure differential which acts on the panels and rotates said panels from said passive position to said active position thereby resulting in a downward force acting on the panels and thus on the motor vehicle roof by reason of the air moving across the roof and urging the motor vehicle against the road; and an air deflection plate pivotedly mounted to the left side of said left opening whereby said air deflection panels rotate from said passive position to said active position said deflection plate rotates to said active position urging the motor vehicle against the road.

2. The aerodynamic stabilizer assembly according to claim 1 wherein said assembly is mounted in the rear portion of the roof of said motor vehicle.

3. The aerodynamic stabilizer assembly according to claim 1 wherein said pair of elongated air deflection panels fit flush with the upper surface of the roof.

4. The aerodynamic stabilizer assembly according to claim 1 wherein said means for limiting the upward rotational movement of the rear edge of each of said elongated air deflection panels are cables having one end attached toward a rear edge of said elongated air deflection panel and the other end attached to the rear portion of the assembly framework.

5. The aerodynamic stabilizer assembly according to claim 1 wherein said elongated air deflection panels are disposed at an angle of from 5 to 60 degrees from each other.

6. The aerodynamic stabilizer assembly according to claim 1 wherein one of the elongated air deflection panels is disposed in the motor vehicle roof perpendicular to a center line from the front to the rear of the roof.

7. The aerodynamic stabilizer assembly according to claim 1 in combination with an elongated rear air deflector affixed to the rear of the motor vehicle extending between the rear of the roof and the rear deck at the left side of the rear window.

8. The aerodynamic stabilizer assembly according to claim 1 in combination with a pair of cowl panels, each having a front edge and a rear edge, and each panel being sized to cover a cowl opening, said cowl opening extending downwardly through the vehicle, and each cowl panel being pivotedly mounted along a longitudinal axis at the front edge of said cowl opening so as to be pivotable between a lowered passive position covering the respective cowl opening and a raised active position.

9. An aerodynamic stabilizer assembly adapted to be mounted in the roof of a motor vehicle having a rear deck and a rear window located between said roof and said rear deck comprising:

an assembly framework having a front edge, a rear edge, side edges and partitioned so as to define a left opening and a right opening;

a pair of elongated air deflection panels, each having a front edge and a rear edge, and each panel being sized to cover one of said framework openings and each air deflection panel being pivotedly mounted along a longitudinal axis at the front edge of said assembly framework so as to be pivotable between a lowered passive position covering the respective framework opening and a raised active position;

means arranged on each longitudinal axis for biasing each air deflection panel toward said passive position;

means for limiting the upward rotational movement of the rear edge of each of said elongated air deflection panels beyond said raised active position, whereby when said motor vehicle is moving at a high rate of speed and is spinning out the low pressure of the air moving across the roof creates a pressure differential which acts on the panels and rotates said panels to rotate from said passive position to said active position thereby resulting in a downward force acting on the panels and thus on the motor vehicle roof by reason of the air moving across the roof and urging the motor vehicle against the road;

an air deflection plate pivotedly mounted to the left side of said left opening whereby when said air deflection panels rotate from said passive position to said active position said deflection plate rotates to said active position urging the motor vehicle against the road; and an elongated rear air deflector affixed to the rear of the motor vehicle extending between the rear of the roof and the rear deck at the left side of the rear window.

10. The aerodynamic stabilizer assembly according to claim 9 in combination with a pair of cowl panels, each having a front edge and a rear edge, and each panel being sized to cover a cowl opening, said cowl opening extending downwardly through the vehicle, and each cowl panel being pivotedly mounted along a longitudinal axis at the front edge of said cowl opening so as to be pivotable between a lowered passive position covering the respective cowl opening and a raised active position.

* * * * *